United States Patent

Oddon

[11] 3,995,169
[45] Nov. 30, 1976

[54] OPTICAL LIQUID LEVEL GAUGE

[76] Inventor: Louis D. Oddon, 5846 East Ave., Livermore, Calif. 94550

[22] Filed: Sept. 17, 1975

[21] Appl. No.: 613,984

[52] U.S. Cl. .............................. 250/577; 73/293; 250/227; 350/96 R
[51] Int. Cl.² ........................................ G01N 21/26
[58] Field of Search .............. 250/227, 577; 73/293; 350/96 R, 96 B

[56] References Cited
UNITED STATES PATENTS

| | | | |
|---|---|---|---|
| 3,120,125 | 2/1964 | Vasel | 350/96 B |
| 3,384,885 | 5/1968 | Forbush | 73/293 |
| 3,535,933 | 10/1970 | Pliml | 350/96 R |
| 3,548,657 | 12/1970 | Panerai et al. | 73/293 |
| 3,553,666 | 1/1971 | Melone | 250/227 |
| 3,683,196 | 8/1972 | Obenhaus | 250/227 |
| 3,834,235 | 9/1974 | Bouton et al. | 73/293 |

*Primary Examiner*—David C. Nelms
*Attorney, Agent, or Firm*—C. Michael Zimmerman

[57] ABSTRACT

An optical liquid level gauge is described for sensing and indicating the height of a liquid within a container, such as within a fuel tank. The gauge includes an optical liquid probe that has a plurality of U-shaped light pipes to be inserted into a tank. Each of the light pipes terminates in a U bend with the U bends of such light pipes being staggered in position relative to one another so as to be positioned at different liquid height indication levels within the tank. A source of light is provided for transmitting light into a first arm of each of the light pipes, and sensors are provided at the end of the second arm of each of such light pipes for detecting the amount of light transmitted from one end of the pipe to the other. The U bend of each pipe has a geometrical design which assures that when liquid is not present in the tank it transmits substantially all of the light received by it from the first arm of the light pipe into the second arm thereof for sensing by the sensor associated therewith. The design of the U bend is such, though, that when the liquid within the tank is at a height submerging the U bend, light received by the U bend from the first arm of the light pipe will be refracted out of such light pipe, rather than passed to the second arm thereof. The sensor associated with the end of the second arm of each light pipe is connected with a display providing a visual indication of whether or not liquid is present at the U bend and, hence, at the liquid level in the container represented by such U bend.

10 Claims, 6 Drawing Figures

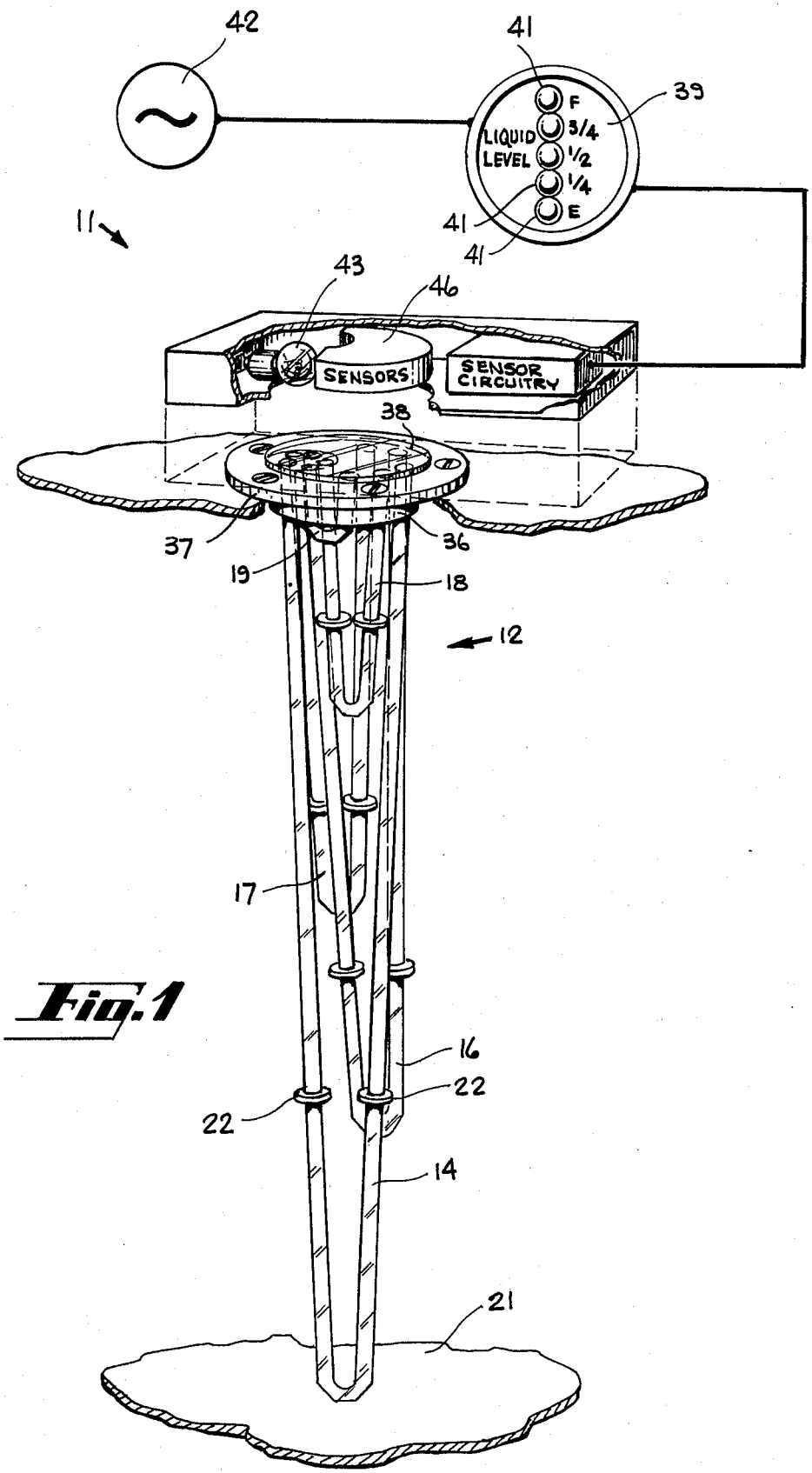

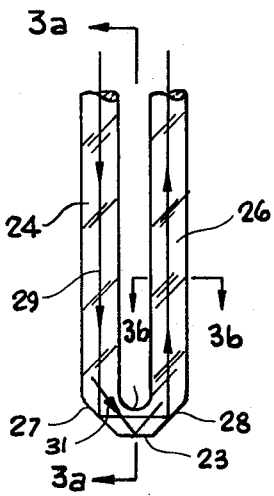
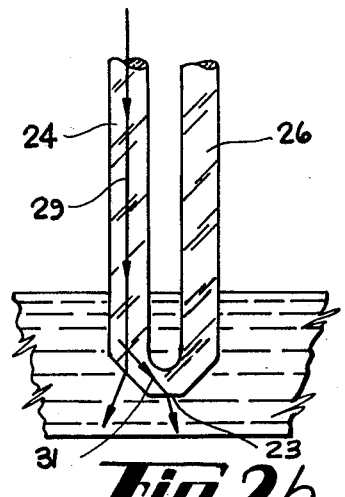
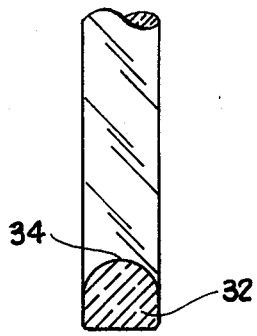
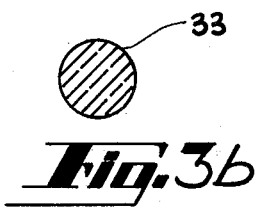
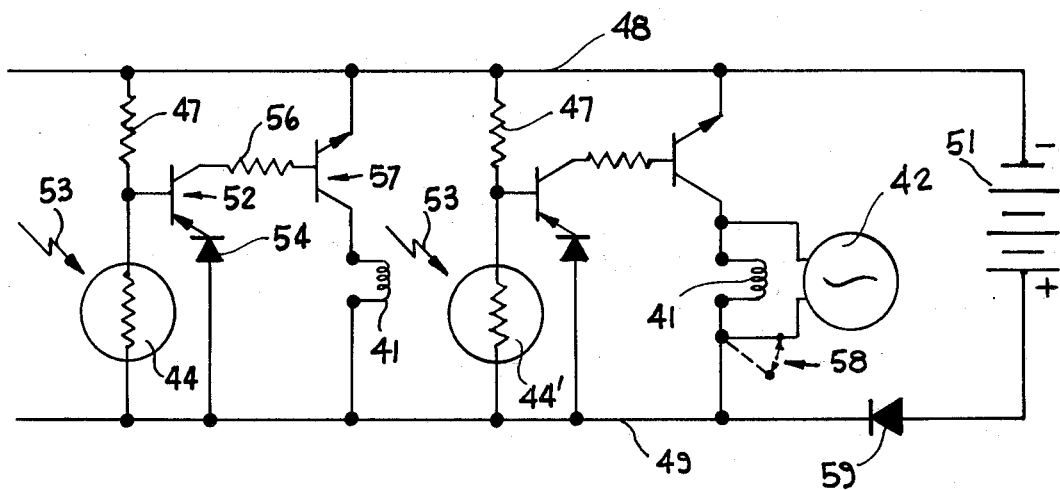

OPTICAL LIQUID LEVEL GAUGE

BACKGROUND OF THE INVENTION

The present invention relates to an optical liquid level gauge and, more particularly, to an inexpensive gauge of this type which enables the level of a liquid in a relatively deep tank to be monitored.

Liquid level gauges have been designed in the past which rely for depth detection on the refraction of light from a light transmitting probe when the probe contacts or becomes submerged within a liquid. Devices of this nature employing optical probes have significant advantages in principle over the mechanical and electrical type devices now commonly used to detect the level of a liquid in, for example, a fuel tank. Such devices generally eliminate the necessity for moving parts; reduce fire or explosion danger; and are able to withstand rolling and pitching motion such as that found on boats, without damage. The difficulty with most devices of this type, though, is that relatively expensive optical probes, such as ones made up of a plurality of fiber optic strands, are generally required to transmit light over a sufficient distance to enable depth measurements at reasonable tank depths. For this reason, such devices have not replaced, to any significant degree, the mechanical or electrical types of devices found in, for example, the fuel tanks of consumer oriented vehicles such as automobiles and pleasure boats.

SUMMARY OF THE INVENTION

The present invention is an optical liquid level gauge having an optical probe arrangement which is quite inexpensive and yet is capable of detecting the level of a liquid within a reasonably deep, e.g., three feet, container. In its basic aspects, the liquid level gauge of the invention includes a plurality of U-shaped light pipes to be inserted into a liquid container whose liquid level is to be monitored so that the U bend or end of each pipe is positioned at a desired liquid height indication level; a source of light at the end of a first arm of each of the light pipes for transmitting light thereinto; sensing means at the end of the second arm of each light pipe for detecting the amount of light transmitted through the pipe; and display means which responds to the sensing means detecting an amount of light transmitted through the pipe indicating that liquid has caused a significant amount of light to be refracted out of the U bend of the pipe by indicating the presence of liquid at the height in the container represented by the position of such U bend.

As a particularly salient feature of the instant invention, it has been found that with proper geometrical design, U-shaped light pipes made from materials such as inexpensive extruded glass and polymeric esters of methacrylic acid, e.g., "LUCITE", can contain and convey enough light over a sufficient distance to enable their use as part of the invention. More particularly, it has been found to be important that such a light pipe be free of any discontinuities, e.g., planar surfaces or interfaces between differing sections of material, between the light source and sensing means which would act, in effect, as light absorption sinks that prevent reliable distinctions to be made between normal light attenuation within the pipe and the loss of light at the U bend of the pipe due to refraction caused by such end being submerged within a liquid. Also, it is most desirable that the cross-sectional area along the light pipe in a direction normal to the direction of light flow therethrough be at least as great along the U bend thereof as along its arms. The result will be that the the capacity of the pipe to transmit light will not be restricted by the presence of such U bend. Also, the U bend of each pipe is most desirably provided with flat internal reflecting surfaces which bend the light around the U bend with a minimum of loss except, of course, when the U bend is submerged within a liquid.

The invention includes other features and advantages which will be discussed or will become apparent from the following more detailed description of a preferred embodiment.

BRIEF DESCRIPTION OF THE DRAWING

With reference to the accompanying two sheets of drawing:

FIG. 1 is an isometric, partly exploded and schematic view of a preferred embodiment of a liquid level gauge of the invention;

FIG. 2a and 2b are enlarged partial views of the U bend of a probe of the gauge of FIG. 1, illustrating both its construction and operation;

FIGS. 3a and 3b are sectional views taken respectively on planes indicated by the line 3a–3a and 3b–3b in FIG. 2a illustrating further details of the construction of the U bend of the probe; and FIG. 4 is an electrical schematic of the sensor and display circuitry of the preferred embodiment of the invention.

DETAILED DESCRIPTION OF THE PREFERRED EMBODIMENT

With reference first to FIG. 1, a preferred embodiment of liquid level gauge of the invention is generally referred to by the reference numeral 11. As is illustrated, such device includes a liquid depth probe 12 which extends into the interior of a liquid container, such as a fuel tank, indicated by a portion of its top wall 13. The probe 12 includes a plurality (in this case, five) U-shaped light pipes 14 and 16–19. As is also illustrated, the light pipes 14 and 16–19 have different lengths so that the positions of the U bends of the same are staggered relative to one another within the container to represent different liquid height indication levels therewithin. That is, the longest light pipe, pipe 14, should extend sufficiently into the container to place its U bend adjacent the container bottom represented at 21, the light pipes 16–18 should have lengths placing their U bends respectively at levels one-quarter, one-half, and three-quarters of the way from the tank bottom 21 to its top 13. The shortest light pipe, pipe 19, should extend only slightly into the interior of the tank to provide an indication of when the liquid in the tank essentially fills the same. Each arm of each light pipe is provided with a bumper or impact collar 22 which prevents the light pipe with which it is associated from being struck and damaged by other ones of the light pipes during relative motion between the same caused by, for example, jerking movement of the tank within which the probe is situated.

As mentioned previously, each of the light pipes 14 and 16–19 is so designed that it is capable of transmitting sufficient light from one end of the same to the other to provide a reliable indication of whether or not light is being refracted from the pipe at its U bend due to the presence of a liquid thereat. In this connection, it should first be noted that each of the U-shaped light pipes is made from a continuous piece of material. That is, each of the light pipes extends as one continuous strand from its end which receives light from a light source to its opposite end, rather than being made in sections or including prisms or the like at its liquid detecting end. The result is that there are no light absorptive interfaces or discontinuities which the light must pass through on its way between the light source and detector.

It is also desirable that the U bend of each light pipe be so designed that even though it acts to bend the light around 180°, it does not cause appreciable loss unless such U bend is submerged within liquid. To this end, with reference to FIG. 2a, it will be seen that the bottom 23 of each of the light pipes is flattened and is joined to each of the arms 24 and 26 thereof by flat surfaces 27 and 28, respectively. The surfaces 27 and 28 meet both the flat bottom 23 and the adjacent arm sidewalls at angles of about 135°. Such flat surfaces provide flat internal reflecting surfaces at the U bend which are positioned to intercept light received from the arm 24 of each pipe and reflect the same through 180° into the light return arm 26. More particularly, the majority of light generally will travel on a path having the direction of arrow 29 and will be intercepted by the internal reflecting surface provided by the flat surface 27. In the absence of liquid at the surface 27, such light will be reflected horizontally as shown to the internal reflecting surface provided by the flat 28 which, in turn, will reflect such light upward for passage through the arm 26. Most of the light traveling down the arm 24 which does not strike the surface 27 will strike instead the flat bottom 23 and, in the absence of liquid at such bottom, be reflected directly into the arm 26. The path of this light is represented in FIG. 2a by the arrow 31.

It should be noted that to obtain such internal reflection, it is important that the index of refraction of the medium surrounding the U bend be smaller than that of the material of such U bend. In most instances, the ambient medium will be air which has an index of refraction of essentially 1. On the other hand, the index of refraction of most extruded glass and plastics, such as LUCITE, is close to 1.5. Moreover, in order to obtain internal reflection it is important that when no liquid is present substantially all the light traveling down arm 24 strikes the surface 27 or the flat bottom 23 at an incidence angle, as measured from a normal to the incident surface, which is larger than the critical angle.

The provision of the flat surfaces 23, 27 and 28 also enhances the refraction of light from the U bend when it is submerged in a liquid. That is, with reference to FIG. 2b, it will be seen that the majority of light transmitted to the U bend from the arm 24, the path of which light is again referred to by the arrow 29, strikes the interface between the liquid and the light pipe at a generally constant incidence angle of about 45°. This incidence angle is chosen to be typically less, as measured from a normal to the surface 27, than the critical angle for light in the material of the light pipe to pass into most liquids. The result will be that such light will be refracted from the same as illustrated in FIG. 2. The majority of that light which does not follow the general path defined by the arrow 29 will, as discussed above, follow the path defined by the arrow 31. This light will strike the interface between the flat bottom surface 23 and the liquid generally also at an angle of 45° and thereby also be refracted from the light pipe as illustrated.

The result of the above is that when liquid is not present at the U bend substantially all light being transmitted through the light pipe will be passed through the U bend without any greater loss than would otherwise occur in the light pipe due to normal attenuation. However, when there is liquid present at the U bend, i.e., when U bend surfaces 23, 27 and 28 are in contact with a liquid mass, substantially all of the light passing through the light pipe will be refracted from the same at the U bend. Thus, there is a significant and easly measured difference between the amount of light which is transmitted along the light pipe when no liquid is present and the amount of light which is transmitted by such U pipe when the U bend is submerged in liquid. The presence of the flat internal reflecting surfaces 23, 27 and 28, therefore, enhances the ability of the probe of the light gauge of the invention to detect the presence of liquid at its U bend.

The U bend of each of the probes has additional geometrical characteristics which enhance the capability of the light pipe. For one thing, the cross-sectional area of each of the light pipes is generally at least as great, and preferably substantially the same, along the U bend of the pipe as along the arms thereof. This relationship is illustrated in the drawing. That is, as indicated, FIG. 3a includes a showing of a cross-section 32 through the U bend, whereas FIG. 3b is a cross-section 33 of arm 26. It is to be noted that each of the cross-sections 32 and 33 is taken in a direction normal to the direction of light flow through the light pipe at its locations. Moreover, the area of cross-section 32 is generally equal to the area of cross-section 33. These cross-sections are illustrative of the fact that all cross-sections taken through the U bend normal to the direction of light flow therethrough are substantially equal to the area of all cross-sections through the arms normal to such light direction. The result of this geometrical relationship is that the capacity of the light pipe to pass light is not restricted by the presence of the U bend. This is important again to assure that when no liquid is present the amount of light passing down arm 24 of the light pipe will also pass upward through the arm 26 except for normal attenuation.

It has been found also to be important if the probe is to be used in a tank to be filled and drained more than once, that the U bend of the probe be designed to prevent liquid from adhering thereto as the tank is drained and causing a false indication of the presence of liquid at such U bend. In this connection, it is important that the re-entrant portion 34 of the U bend be designed not to act as a shelf to accumulate liquid. To this end, such re-entrant portion 34 is convexly shaped in a direction perpendicular to the plane of the light pipe. The result in that any liquid which might tend to accumulate at the re-entrant portion will run off and not act as an absorption sink for light passing through the U bend.

The combination of the above geometrical characteristics of the U bend has been found to enable the use of inexpensive materials for light pipes which effectively distinguish between the presence and lack of liquid at depths as great as three feet.

With reference again to FIG. 1, it will be seen that the light pipes 14 and 16–19 are supported within the tank represented by the walls 13 and 21 by a cylindrical end block 36 which has a circumferential collar 37. The collar 37 secures the assemly to the exterior side of the wall 13 by, for example, cooperating nuts and bolts. As illustrated, the ends of the rods 14 and 16–19 extend upwardly through bores in block 36 and terminate adjacent its upper surface. A transparent layer of disc 38 of a clear material seals the upper surface of the collar and prevents vapors and the like from escaping from the tank.

As another salient feature of the instant invention, the support for the light pipes is adapted to prevent its presence from acting to absorb light from such pipes. That is, the interface between the side walls of the pipe and the surfaces of the support which grips the same is adapted to return by reflection to the light pipe, any light which otherwise might escape from the same due to the presence of the support means. To this end, the block 36 is made of a reflective material, e.g., aluminum, and the bores holding the ends of the light pipes are highly polished to be light reflective. Thus, the presence of the supporting collar gripping the sidewalls of the light pipes does not interfere with the light transmission capability of such light pipes.

The gauge of the invention further includes a display providing a visually perceivable indication at any time of whether or not liquid is in the tank at any liquid height indication level monitored by one of the light pipes 14 and 16-19. In this regard, a display gauge 39 includes a plurality of light indicators 41 which are respectively associated with a corresponding one of the light pipes to be energized when liquid is at the level represented thereby. Thus, when the tank is one-half full, i.e., liquid covers the U bend of pipes 14, 16 and 17, the three lowermost lights of the display gauge 39 will be lit. When, however, the liquid level retreats to below one-half full, i.e., when the U bend of rod 17 is not submerged within such liquid, only the two lower lights will be energized. By monitoring the state of the lights 41, an operator can determine the general level of liquid within the tank. An audio alarm 42 such as a horn, buzzer, bell, relay with a warning device, etc., can also be provided to be energized when the liquid level reaches or falls below a predetermined level. For example, when the tank reaches the "Full" light pipe U bend the audio alarm can be energized to warn the operator that the tank is full so that he can prevent the tank from overflowing. It will be recognized that in some industrial processes it may be desirable to provide an audio alarm in association with a different one or ones of the liquid height level indicators to provide warning of a liquid height change detected by the light pipe U bend at some other liquid height level.

The liquid level gauge of the invention further includes a relatively simple and inexpensive means for converting height levels sensed by the light pipes to readings at the display indicator 39. In this connection, as is shown in FIG. 1, the ends of the first or light receiving arms 24 of the light pipes are all gathered together adjacent one another so that one light source represented by the bulb 43 is capable of simultaneously transmitting light into all of such arms. The ends of the light return arms 26 of the light pipes are, on the other hand, somewhat spaced from one another so that light transmitted from each can be distinguished from light transmitted from the others. Sensing means are provided at the end of the light return or second arms 26 of the light pipes for detecting the amount of light transmitted through each pipe from its first end to its second end. That is, sensors in the form of photoconductive cells, two of which are represented in FIG. 4 and 44, are positioned within a sensor housing 46 at locations at which each will receive light transmitted to the second end of a light pipe with which it is associated. In this connection, it will be appreciated that while in order to facilitate drawing comprehension the sensor housing 46 is shown in FIG. 1 spaced away from the second ends of the arms, the housing is actually mounted against the upper surface of the sealing disc 38 with each of the sensors in close proximity to its associated light pipe arm end.

The photoconductive cells are connected within circuitry which acts, in effect, as switching means responsive to the indication by such cells of the presence of liquid at the U bend of a light pipe by energizing the appropriate indicator lamp 41. That is, it will be seen with reference to FIG. 4 that the photo-conductive cells 44 are each connected in series with a resistor 47 between bus lines 48 and 49 which are, in turn, connected respectively to the negative and positive terminals of a battery 51. As is known, the resistance of a photoconductive cell to the passage of electrical current therethrough is directly dependent upon the amount of light which impinges thereon. The value of each of the resistors 47 is therefore chosen to act with the resistance of the photoconductive cell to which it is connected as a voltage divider which controls operation of a PNP transistor 52 whose base is connected therebetween. That is, the value of each resistor 47 is chosen, relative to the value of the photoconductive cell resistance when the amount of light it is receiving indicates that the U bend of the light pipe with which it is associated is not submerged in liquid, to bias the base of the transistor 52 positively to prevent the transistor from conducting current. In this connection, a breakdown diode 54 is provided to sharpen the response of transistor 52 to the application of switching voltages to its base by the voltage divider.

As illustrated, the collector of transistor 52 is connected through current limiting resistor 56 to the base of a NPN transistor 57. When transistor 52 is "off" as aforesaid, i.e., when the photoconductive cell 44 is receiving an amount of light indicative of no liquid being present at the U bend of the light pipe with which it is associated, such transistor 52 applies no bias potential to the base of the transistor 57 and thereby does not turn on the latter transistor. Thus, the lamp indicator 41 in series therewith between the buses 48 and 49 is prevented from being energized. On the other hand, when the U bend of the light pipe associated with the photoconductive cell 44 of interest is submerged within liquid, a negative bias will be applied to the base of transistor 52, because the lower amount of light received by the photoconductive cell will increase its resistance and, hence, change the relationship of the values of the resistance of the photocell and resistor 47 to apply such negative bias to the base of transistor 52. The result will be that such transistor will be turned on to apply a positive potential to the base of the transistor 47. The transistor 57 will thus conduct current between the buses 48 and 49 and, hence, the lamp indicator 41 associated therewith will be energized.

While the switching circuitry for only two of the photoconductive cells is illustrated in FIG. 4, it will be recognized that the same circuitry is repeated for all of such cells. More particularly, each photoconductive cell and its associated switching connection as described to a lamp indicator 41 is connected between the buses 48 and 49.

The photoconductive cell associated with the "Full" light pipe 19 is represented in FIG. 4 by the reference numeral 44'. Its circuitry differs from that of the other photoconductive cells only in that the audio alarm 42 is connected across the lamp indicator 41 associated therewith. The result is that when the lamp indicator is energized, the audio alarm 42 will also be energized. A manually operated de-energization switch for the audio alarm 42 is schematically represented at 58. The purpose of such switch is to enable an operator to manually deactivate such alarm after it has served its purpose, even though the lamp 41 remains energized.

As described above, the switching circuitry is powered by a battery 51. In order to assure that inadvertent reverse placement of the battery 51 in the circuitry will not result in damage to the circuitry, a protective diode 59 is included to prevent the application of reverse potential to the transistors and photoconductive cells.

From the above, it will be seen that a quite reliable and yet inexpensive switching circuitry is provided for converting the detection of light by the photoconductive cells to appropriate energization of the display lamps and audio alarm. The combination of such circuitry with the remainder of the gauge provides the total gauge with the reliability and inexpensiveness required for many uses. And although the invention has been described in connection with a preferred embodiment, it will be appreciated by those skilled in the art that various changes and modifications can be made without departing from its spirit. For example, the U bend of a light pipe can be turned outwardly 90° from the plane of the pipe with a 45° internal reflecting and refracting surface provided at the turns to communicate the light pipe arms and the turned U bend. The added refraction and thus attenuation obtained with such an arrangement when liquid is present due to the extra 45° surfaces at the U bend may be desirable in embodiments of the invention in which the light pipes carry more light than the described preferred embodiment. Because of this and other potential modifications, it is intended that the coverage afforded applicant be limited only by the scope of the claims and their equivalent language.

I claim:
1. A liquid level gauge for indicating exteriorly of a liquid container, the height to which liquid has displaced an ambient medium within said container comprising:
   a. a plurality of continuous U-shaped light pipes, each of which has distinct first and second arms which are separated from one another except for a connection therebetween at one end by a U-bend integral therewith, said light pipes being adapted for insertion into said container with the U-bend of each positioned therewithin generally at a desired liquid height indication level;
   b. a source of light at the end of said first arm of each of said light pipes for transmitting light thereinto;
   c. sensing means at the end of the second arm of each of said light pipes for detecting the amount of light transmitted through said pipe from its first end to said second end;
   d. each of said light pipes being continuous and free of light absorptive discontinuities between said ends, and the geometry of each of said light pipes at the U-bend thereof relative to the indices of refraction of the material of said pipe and said liquid providing refraction of a measurably greater amount of light from said U-bend of said pipe when said U-bend is submerged in said liquid than when said U-bend is in said medium; and
   e. display means responsive to said sensing means detecting an amount of light transmitted through one of said light pipes indicative of refraction of said measurably greater amount of light from the U-bend thereof by indicating the presence of liquid at the liquid height indication level represented by the position of said U-bend in said container.

2. The liquid level gauge of claim 1 further including support means gripping the sidewalls of each of said light pipes for supporting the ends of each exteriorly of said container with its U bend within said container generally at said desired liquid height indication level, the interface between the sidewall of each of said light pipes and said support means being adapted to essentially prevent absorption of light from said light pipe by said support means.

3. The liquid level gauge of claim 1 wherein the U-shaped end of each of said light pipes includes generally flat internal reflecting surfaces positioned to intercept light from said first arm and reflect the same into said second arm.

4. The liquid level gauge of claim 3 wherein the cross-sectional area of each of said light pipes normal to the direction of light flow therethrough is generally at least as great along the U bend of said pipe as along the arms thereof, whereby the capacity of said pipe for light passage is not restricted by said U bend.

5. The liquid level gauge of claim 4 wherein the U bend of each of said light pipes has a re-entrant portion that has a surface configuration which prevents accumulation of liquid thereat.

6. The liquid level gauge of claim 1 wherein the U bends of said light pipes are respectively staggered in position relative to one another to be positioned at different liquid height indication levels within a container; and said sensing means includes a plurality of separate sensors each of which is associated with a corresponding one of said light pipes at the end of the second arm thereof to enable individual detection of the amount of light transmitted through each of said pipes from its first end to its second end, and said display means is responsive to each of said sensors detecting an amount of light transmitted through its associated light pipe indicative of refraction of said measurably greater amount of light from the U bend thereof by indicating the presence of liquid at the liquid height indication level represented thereby.

7. The liquid level gauge of claim 6 wherein said display means includes a plurality of indicators each of which is associated with a corresponding one of said sensors and provides visually perceivable indications of whether or not the U bend of the light pipe associated therewith indicates the presence of liquid at the liquid height indication level represented by the position of said U bend in said container.

8. The liquid level gauge of claim 7 wherein said display means further includes for at least one of said light pipes, an audio alarm responsive to the sensor associated with said light pipe indicating detection of a liquid height change at the liquid height indication level represented by the position in said container of the U bend of said light pipe by emitting an audio signal to call the attention of an operator to the change in liquid height at said level.

9. The liquid level gauge of claim 7 wherein said display means for each of said light pipes includes a lamp indicator and switching means responsive to the sensor associated therewith indicating the presence of liquid at the liquid height indication level represented by the position of the U bend of said light pipe in said container by energizing said lamp indicator.

10. The liquid level gauge of claim 9 wherein each of said sensors is a photoconductive cell whose resistance to the passage of electrical current varies directly with the amount of light received thereby, and said switching means includes a pair of transistors connected between said photoconductive cell and said light indicator to energize the latter when the resistance of said photoconductive cell is at a predetermined high value indicative of refraction of said measurably greater amount of light from the U bend of the light pipe with which it is associated.

* * * * *